July 7, 1964 G. R. LOEWE 3,140,352

AMPLIFIER AND CLAMP CIRCUIT FOR PULSE COMMUNICATION SYSTEM

Filed Oct. 16, 1961 2 Sheets-Sheet 1

*INVENTOR.*
GEORGE R. LOEWE
BY
ATTY.

July 7, 1964 G. R. LOEWE 3,140,352

AMPLIFIER AND CLAMP CIRCUIT FOR PULSE COMMUNICATION SYSTEM

Filed Oct. 16, 1961 2 Sheets-Sheet 2

INVENTOR.
GEORE R. LOEWE

BY

ATTY.

United States Patent Office 3,140,352

Patented July 7, 1964

3,140,352

AMPLIFIER AND CLAMP CIRCUIT FOR PULSE COMMUNICATION SYSTEM

George R. Loewe, Addison, Ill., assignor to Automatic Electric Laboratories, Inc., Northlake, Ill., a corporation of Delaware Filed Oct. 16, 1961, Ser. No. 145,424
12 Claims. (Cl. 179—15)

This invention relates to signal transmission circuits and more specifically it relates to circuits for improving the transmission of signals therein.

In the majority of the present day high speed information handling systems, time-sharing or time division multiplexing is used, and the information to be transferred from one communication terminal to another is transferred over a common signal transmission link. Each pair of terminals in communication is assigned a cyclically recurring discrete time slot during which time this information may be transferred. A transmission gate associated with each of these communication terminals connects them to the common signal transmission link during the time slot assigned, and disconnects them during the time or guard interval between their recurring time slots.

While this mode of operation is particularly desirable because of the large number of communication terminals which may share a single, common signal transmission link, various problems are encountered which degrade the performance of the system. Transmission losses resulting from the sampling, filtering and gating of the signals to be transferred, and interchannel interference due to signals from a prior time slot remaining on the common signal transmission link being passed on in subsequent time slots are two of the problems presenting serious limitations on high-grade transmission.

There are then at least two ways in which the transmission of signals in high speed information handling systems may be improved, by inserting amplification to overcome these losses in the system and by removing any charges remaining on the common signal transmission link during the guard intervals between the time slots.

While the present invention is particularly applicable for use in all high speed information handling systems of the type described for improving the transmission of signals therein by performing each of the above-mentioned functions its use is not limited to such systems. The invention is applicable for use in any type of system wherein it is desired to maintain a particular potential at a point within the system and/or to amplify signals at a point within the system.

Accordingly, it is an object of this invention to provide a circuit network for improving the transmission of signals in signal transmission systems.

A time division multiplex telephone system is an example of a high speed information handling system of the type described. There have been various arrangements designed to perform one or the other, or both, of the above-mentioned functions to improve signal transmission in time division multiplex telephone systems. While each of these arrangements has been generally satisfactory, they have also been lacking in some respect and have not provided the ultimately desired improvements in transmission. One such illustrative arrangement, for example, is disclosed in Patent No. 2,927,967 to J. O. Edson, which issued March 8, 1960. The most serious limitation of the arrangement disclosed by this cited patent is its inability to completely remove the charge remaining on the common signal transmission link during the guard interval. For example, in the case of the Edson disclosure the capacitor included in the series tuned circuit must be discharged during the guard interval to provide stability for the amplifier and to reduce the resulting interchannel interference. A pair of transistor switches are used to discharge this capacitor and, as is generally the case, the transistors are driven into saturation in order to achieve faster and more positive operation.

This capacitor, therefore, can only be discharged to the saturation voltage of the transistors, and the common transmission link is not sufficiently discharged and interchannel interference results. The same limitation is encountered in other prior arrangements of this type since they also in one way or another are dependent upon the saturation voltage of transistors.

Several other limitations which have been noted in these prior arrangements are the inability to completely turn them off during the time slot in low impedance circuits and the inability to completely discharge any inductance during the guard interval due to the time constants involved. It is a further object of this invention to provide an improved circuit network for improving the transmission of signals in signal transmission circuits which is not subject to any of these mentioned limitations.

It is a further object of this invention to provide an improved clamping arrangement for maintaining a predetermined value of potential at a point in an electrical circuit.

It is a still further object of this invention to provide a new and improved combination amplifier and clamping circuit.

A feature of this invention as disclosed in one illustrative embodiment is that a simple two stage amplifier with a closed loop gain of minus one is provided to completely dissipate any signals which are present on, for example, the common signal transmission link employed in a high speed information handling system, which may vary from a predetermined D.C. level of potential established at its input.

A further feature of this invention as disclosed in a second illustrative embodiment is that a simple two stage amplifier with transformer inter-coupling and switching means for connecting certain ones of the transformer windings in the inter-coupling between the two amplifiers is provided to alternately amplify and to completely dissipate pulses which are present on, for example, the common transmission link employed in a high speed information handling system, during a pulse interval and during a guard interval between the pulses, respectively.

These and other objects and features not specifically mentioned will become obvious and a fuller understanding of the invention may be had by considering the illustrative embodiments now to be described with reference to the accompanying drawings.

In these drawings.

In each of the above figures the components which correspond to the same components in the various figures of the drawings are given like reference numerals.

Figure 1:
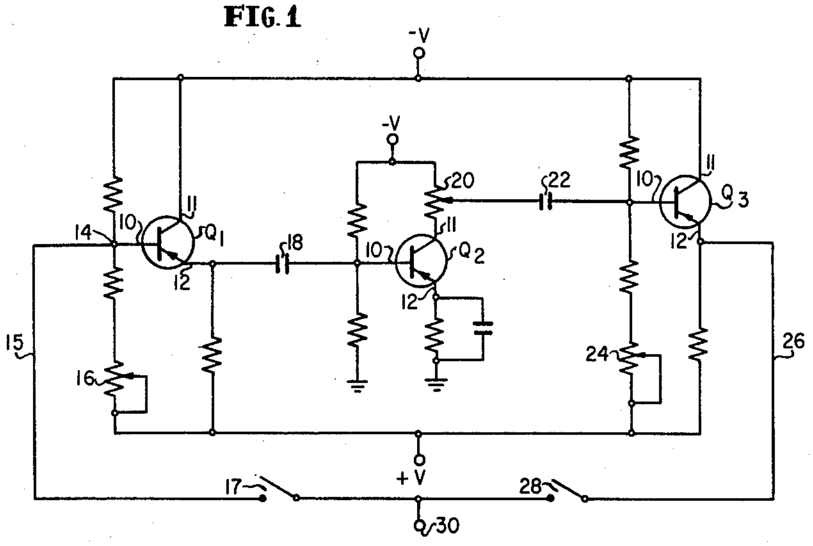
FIG. 1 shows a clamping circuit in accordance with this invention.

Referring now to FIG. 1, a clamping circuit, in accordance with the invention, is shown comprised of a three stage amplifier including the transistors $Q_1$, $Q_2$ and $Q_3$, respectively, each of which has a base electrode 10, a collector electrode 11 and an emitter electrode 12. Transistor $Q_1$ has its electrodes connected in a common collector configuration with the biasing resistors, operating point and supply voltage selected so that its base electrode 10 can be biased at zero volts; transistor $Q_2$ has its electrodes connected in a common emitter configuration; and transistor $Q_3$ also has its electrodes connected in a common collector configuration with the biasing resistors, operating point and supply voltage selected so that its emitter electrode 12 can be biased at zero volts. Adjustable resistors 16 and 24 are provided so that this zero volts bias potential can be precisely adjusted at the base electrode 10 of transistor $Q_1$ and the emitter electrode 12 of transistor $Q_3$, respectively. Capacitors 18 and 22 are provided for coupling between the three stages. Two switches 17 and 28 are shown for connecting the terminal 30 to the input or base electrode 10 of transistor $Q_1$ by way of conductor 15 and the output or emitter electrode 12 of transistor $Q_3$ to the terminal 30 by way of conductor 26, respectively. These switches are shown for convenience as a pair of contacts, however, they may be advantageously of the type disclosed in a copending application by J. J. Carroll, filed October 11, 1961, Serial No. 144,358, and assigned to the same assignee as the present invention. The significance of the switches 17 and 28 will be more fully explained in the material which follows.

The operation of the clamping circuit may best be explained by first assuming that the switches 17 and 28 are both open. With switches 17 and 28 both open, the voltage gain of the second stage amplifier comprising the transistor $Q_2$ is adjusted by means of the potentiometer 20 so that the overall voltage gain of the three stages is one. Since, as it is well known in the art, a transistor amplifier having its electrodes connected in a common collector configuration has an output signal which is in phase with its input signal and a transistor amplifier having its electrodes connected in a common emitter configuration has an output signal which is inverted or 180° out of phase with its input signal the overall effect of the above adjustment is to provide at the output of the three stages a signal which is a replica of the input signal, but inverted.

If the switches 17 and 28 are now both closed and the terminal 30 connected to a point in an electrical circuit or a signal source, the terminal 30 will be at zero D.C. volts potential and no signal will appear at this point since the closed loop voltage gain of the clamping circuit is effectively minus one (−1).

It may be noted that the third amplifier stage comprising the transistor $Q_3$ can be eliminated and the output coupled directly through the capacitor 22 and the switch 28 to the terminal 30. It has been found that in some cases the additional buffer amplifier improves the performance of the circuit but in most cases the additional stage is not necessary.

It may further be noted that the clamping circuit can be adjusted to establish any D.C. level of potential within the operation limits of the transistors $Q_1$ and $Q_3$ by adjusting the bias potentials established at the base electrode 10 of transistor $Q_1$ and the emitter electrode 12 of the transistor $Q_3$ to correspond to the desired D. C. level.

Figure 2:
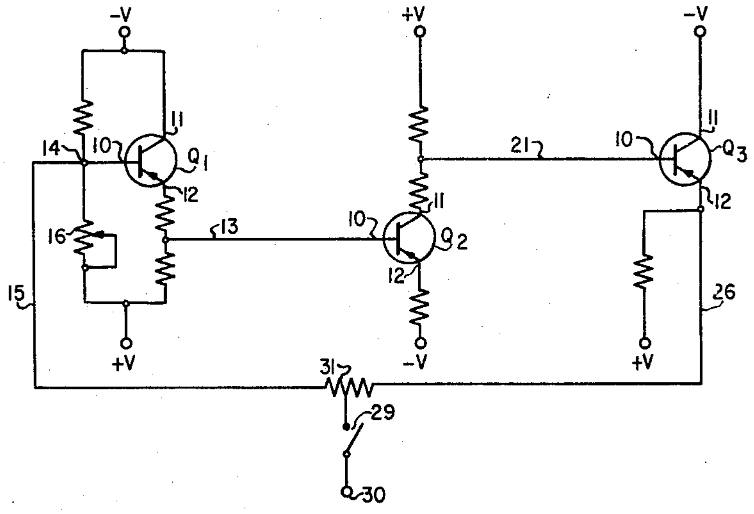
FIG. 2 shows a variation of the clamping circuit shown in FIG. 1.

FIG. 2 shows a variation of the clamping circuit shown in FIG. 1. The operation of the two clamping circuits is the same, the only difference being the clamping circuit shown in FIG. 1 is internally A.C. interconnected while that of FIG. 2 is completely D.C. connected. Also, it may be noted that only a single switch 29 is necessary and a potentiometer 31 is permanently connected in the feedback loop for complete D.C. stabilization. Furthermore, as in the case of the clamping circuit shown in FIG. 1 the third stage comprising transistor $Q_3$ can be eliminated and the output coupled by the conductor 21 through the potentiometer 31 to the terminal 30.

Figure 3:
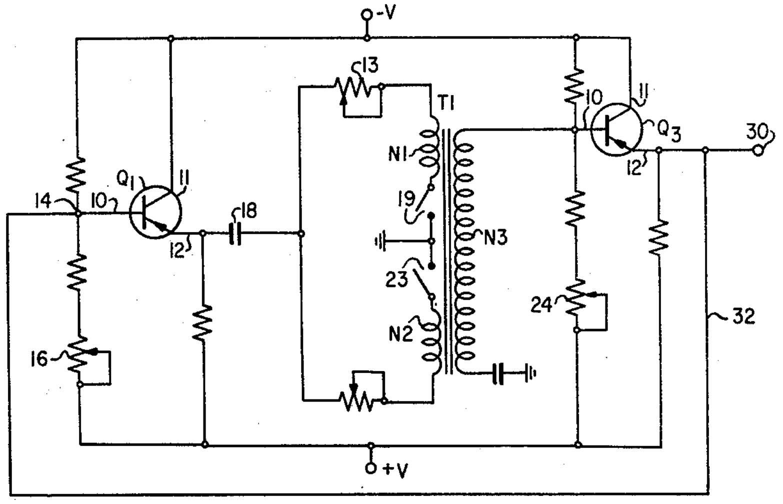
FIG. 3 shows a combination amplifier and clamping circuit in accordance with this invention.

A combination amplifier and clamping circuit in accordance with this invention is shown in FIG. 3 comprised of a two stage amplifier including transistors $Q_1$ and $Q_3$, transformer inter-coupled. Each of the transistors $Q_1$ and $Q_3$ has its base electrode 10, collector electrode 11 and emitter electrode 12 connected in a common collector configuration. The transformer $T_1$ has three windings $N_1$–$N_3$. Two switches 19 and 23 are provided to alternately include along with winding $N_3$ either the winding $N_1$ or $N_2$ as the coupling between the stages. The switches 19 and 23 although shown merely as a pair of contacts may also be of the type disclosed in the copending J. J. Carroll application.

The transistors $Q_1$ and $Q_3$ function the same as transistors $Q_1$ and $Q_3$ in the previously described clamping circuits disclosed in FIGURES 1 and 2. The operation of the circuit may be best explained by opening the conductor 32 connected between the emitter electrode 12 and the base electrode 10 of the transistors $Q_1$ and $Q_3$, respectively, and by assuming that the switch 19 is open and that the switch 23 is closed. In this condition since the transistor $Q_1$ is connected in a common collector configuration any voltage applied to its base electrode 10 appears as its output emitter electrode 12 in phase with its input voltage. Since switch 19 is open and switch 23 is closed, the input voltage appears across winding $N_1$ of transformer $T_1$; is stepped up by transformer $T_1$; and applied to the base electrode 10 of the transistor $Q_3$ still in phase with the input signal. Transistor $Q_2$ also has its electrodes connected as a common collector stage and, therefore, the voltage at its base electrode 10 appears at its emitter electrode 12 still in phase with its input voltage. The output signal of the two stages is therefore a replica of the input signal only it is increased by the turns ratio of $N_1$:$N_3$ of transformer $T_1$. The operating conditions of transistor $Q_3$ are determined by the gain required in the system and the maximum signals to be handled.

If the loop between the base 10 of transistor $Q_1$ and the emitter electrode 12 of transistor $Q_3$ is now closed, the terminal 30 connected to a point in, for example, the common transmission link of a high speed information system, switch 19 closed and switch 23 open the circuit will insert voltage and current onto the common transmission link.

To see how the circuit performs the clamping function, again open the conductor 32 between the emitter electrode 12 of transistor $Q_3$ and the base electrode 10 of the transistor $Q_1$, open the switch 19, and close the switch 23. The operation of the circuit is as previously described with one exception. Since the switch 19 is now open and switch 23 closed the output signal appears across winding $N_2$ instead of winding $N_1$ and the voltage applied to the base electrode 10 of transistor $Q_3$ is 180° out of phase with the input signal. The output voltage at the emitter electrode 12 of transistor $Q_3$ is therefore out of phase with the input voltage, and its magnitude is determined by the turns ratio $N_2$:$N_3$ of transformer $T_1$. Supply voltages and operating points of transistors $Q_1$ and $Q_3$ are selected consistent with requirements for amplification and to give a zero volt bias at the base electrode 10 of transistor $Q_1$ and the emitter electrode 12 of transistor $Q_3$.

If the conductor 32 connecting the emitter electrode 12 of transistor $Q_3$ and base electrode 10 of transistor $Q_1$, is now closed, switch 19 open, switch 23 closed and the terminal 30 connected to a point in, for example, the common transmission link of a high speed information handling system, it can be seen that the transmission link is held at zero D.C. volts potential and cannot change from this level due to the 180° phase shift of the signal at the output of the amplifier.

To illustrate an application of the circuits described above, there is shown in FIG. 4 the components of a time division multiplex telephone system employing the principle of resonant transfer for transferring information between a plurality of stations connected to a common transmission link in sufficient detail to explain the basic principle of operation. Generally, each of the stations in a telephone system of this type includes a low pass filter network with shunt capacitance, an inductor, and a high-speed transmission gate for connecting the station to the common transmission link.

Figure 4:
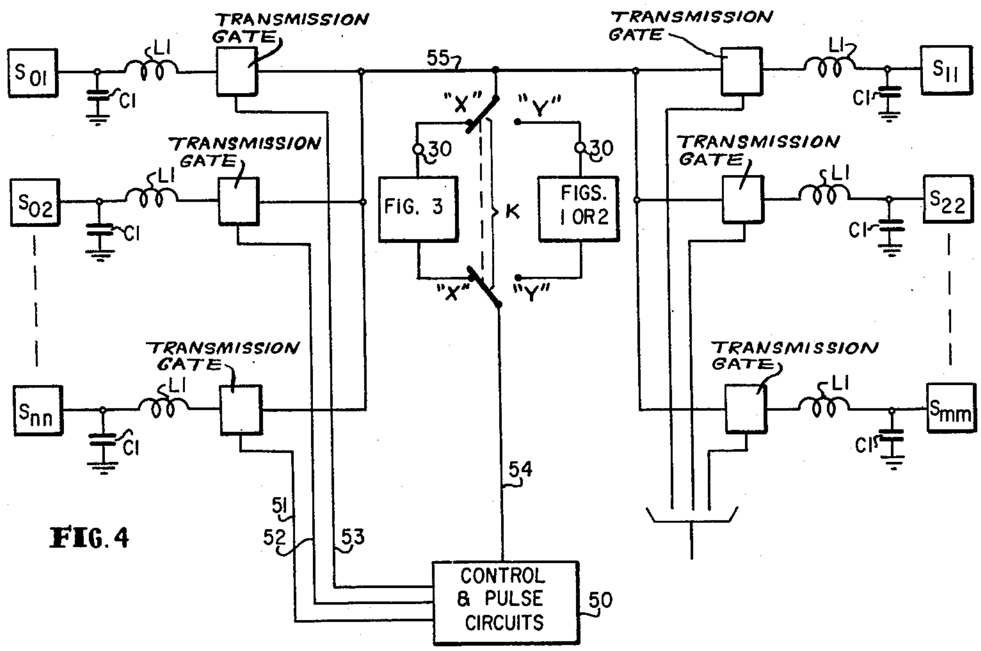
FIG. 4 is a partially schematic diagram which illustrates a simplified time sharing communication system in which signal transmission is improved by employing circuit networks in accordance with this invention.

In FIG. 4, each of the stations $S_{01}$, $S_{02}$ . . . $S_{nn}$ and the stations $S_{11}$, $S_{22}$ . . . $S_{mm}$ is shown comprising a capacitance C1 which represents the shunt capacitance of the low pass filter network, an inductance L1, and a transmission gate TG connecting the station to the common transmission link 55. These components as well as any stray capacitance and inductance in the transmission gates TG and the common transmission link 55 form a resonant circuit for transferring information between the stations, either directly or over the common transmission link 55.

The transmission gates TG are normally open and prevent any signals from flowing over the common transmission link 55. Any signals originating at a station pass through the low pass filter network and are stored in the shunt capacitance C1, during this time. Upon choosing the transmission gates TG at a calling and a called station these signals are transferred through the transmission gate TG directly or over the common transmission link 55, through the transmission gate TG at the called station and are stored in the shunt capacitance C1 of the low pass filter at the called station.

A charged capacitance connected to a similar uncharge capacitance in this manner normally results in a sharing of the charge between them. In time division multiplex telephone systems each pair of stations in communication is assigned a cyclically recurring discrete time slot during which time information may be transferred. When the principles of resonant transfer of signals is employed, one-half cycle of the resonant frequency is determined to be precisely equal to the length of a time slot, thus in one-half cycle of the resonant frequency all of the charge stored on the capacitance C1 at a calling station is transferred to the capacitance C1 at a called station. Timing of the transmission gates TG is such that the gates TG are open at the end of the time slot which corresponds to the instant current reversal would occur, thus any return flow is prevented.

A transmission gate which satisfies the requirements for systems of this type is disclosed in the above-mentioned copending Carroll application. Control and pulse circuits 50 for selectively enabling the transmission gates TG and for performing other operations not specifically mentioned may be of the type disclosed in the copending application of A. H. Faulkner et al., Serial No. 843,380, filed September 30, 1959, and now U.S. Patent No. 3,015,-699.

The transmission losses resulting from filtering, sampling and gating of the signals and/or the interchannel interference previously mentioned may be eliminated by employing either the *"x"* or *"y"* wiring shown schematically represented in FIG. 4 by the switch K having *"x"* any *"y"* positions, which will connect the combined amplifier and clamping circuit shown in FIG. 3 and the clamping circuit shown in FIG. 1 or 2 to the common transmission link 55, respectively. Control of the switches in these circuits are controlled by pulses derived from the control and pulse circuits 50.

Assume, for example, that the *"x"* wiring is employed and symbolically the switch K is in the *"x"* position, thus the combination amplifier and clamping circuit of FIG. 3 is connected to the common transmission link 55, and that the station $S_{01}$ is calling the station $S_{11}$. Signals originating at the station $S_{01}$ pass through the low pass filter and are stored in the shunt capacitance C1. Sometime during each frame the cyclically recurring discrete time slot assigned to the stations $S_{01}$ and $S_{02}$ by the control and pulse circuits 50 will occur and the transmission gates TG associated with these stations will be simultaneously enabled to gate the signals stored on the capacitance C1 onto the common transmission link. Simultaneously with this operation pulses derived from the control and pulse circuits 50 will cause the switches 19 and 23 to close and to open, respectively, to thereby include the winding $N_1$ in the intercoupling between the two amplifiers comprising the transistors $Q_1$ and $Q_3$.

The signals now flowing on the common transmission link 55 are detected at the terminal 30 and are coupled by the conductor 32 to the input or base electrode 10 of transistor $Q_1$. Any signal which is greater or less than the zero reference potential established at the input appears at the output or emitter electrode 12 of transistor $Q_1$, is coupled by the capacitor 18 to the winding $N_1$ of the transformer $T_1$, stepped-up by the turns ratio of $N_1$:$N_3$ and coupled to the base electrode 10 of transistor $Q_3$ and will appear at its emitter electrode 12. Since, as it was previously explained, transistors $Q_1$ and $Q_3$ both have their electrodes connected in a common collector configuration the same signal as impressed on the base electrode 10 of transistor $Q_1$ will appear at the emitter electrode 12 of transistor $Q_3$, only stepped-up by the turns ratio of $N_1$:$N_3$. This stepped-up signal is coupled back to the common transmission link, thus effectively increasing the gain of the system to overcome any transmission losses.

During the guard interval which immediately follows, pulses from the control and pulse circuits 50 will disable the transmission gates TG associated with stations $S_{01}$ and $S_{11}$ and will cause switch 19 to open and switch 23 to close, thus including the winding $N_2$ in the intercoupling between the two stages.

Any signal or charge which may be on the common transmission link at this time is detected at the terminal 30 and coupled to the input or base electrode 10 of transistor $Q_1$. This signal will ultimately appear at the output or emitter electrode inverted or 180° out of phase with the signal at the input since, as previously explained, the signal flows through the winding $N_2$ and is inductively coupled to winding $N_3$ rather than through the winding $N_1$ as in the previous situation. This inverted signal when coupled back to the common transmission link 55 effectively eliminates any signal which may be present and the common transmission link 55 is clamped at zero volts D.C. potential, thus the possibility of any interchannel interference is eliminated. Of course, if it is desired to clamp the common transmission link 55 at any other level the adjustable resistors 16 and 24 may be varied to establish the desired level, in the manner previously described.

If it is only necessary or desired to guard against cross-talk the *"y"* wiring may be used, thus either the clamping circuit shown in FIG. 1 or 2 is connected to the common transmission link, again symbolically, by placing the switch K in the *"y"* position. Assuming the same situation as above, during the guard interval pulses are derived from the control and pulse circuits 50 to operate the switches 17 and 28, or switch 29 in the case of the clamping circuit shown in FIG. 2. Any signal or charge remaining on the common transmission link 55 is again coupled to the base electrode 10 of transistor $Q_1$ and coupled from its emitter electrode 12 by means of capacitor 18 to the input of transistor $Q_2$. Since transistor $Q_2$ has its electrodes connected in a common emitter configuration its output signal taken from the collector electrode 11 is inverted or 180° out of phase with the input signal. This inverted signal may be coupled directly to the terminal 30 by way of switch 28 or it may be coupled to the buffer amplifier comprising the transistor $Q_3$ and to the terminal 30 by way of switch 28, as previously explained. Also, as it was stated the overall gain of the three stages is adjusted by means of the potentiometer 20 to be minus one (−1) and the output signal impressed on the terminal 30 is the inverted replica of the input signal. The common transmission link is therefore clamped at zero volts D.C. potential. The operation for the clamp of FIG. 2 is the same as described except for the operation of the single switch 29.

The above-described arrangements are merely illustrative of the invention and it is to be understood that numerous modifications may be resorted to without departing from the true spirit and scope of the invention as defined in the appended claims.

What is claimed is:

1. In an electrical circuit including a conductor carrying a potential of varying value, a circuit network having a common input and output terminal connected to a point in said conductor, said network comprising:

transistor means connected to said common terminal for amplifying alternating current signals at said point;

transistor means connected to said amplifying means for inverting and coupling said amplified alternating current signals back to said common terminal, whereby alternating current signals are substantially eliminated at said point of said conductor;

direct current biasing means for said transistor means; and means including said biasing means for establishing a direct current potential of predetermined value at said point.

2. In an electrical circuit including a conductor carrying pulses separated by guard intervals, a circuit network having a common input and output terminal connected to a point in said conductor, said circuit network comprising:

transistor means connected to said common terminal for amplifying alternating current signals at said point;

transistor means connected to said amplifying means for inverting and coupling said amplified signals back to said common terminal, whereby alternating current signals are substantially eliminated at said point of said conductor;

direct current biasing means for said amplifying means; and means including said biasing means for establishing a direct current potential of predetermined value at said point only during said guard intervals.

3. In an electrical circuit including a conductor carrying pulses separated by guard intervals, a circuit network, as claimed in claim 2, further comprising switching means for connecting said circuit network to said point in said conductor during said guard intervals.

4. In an electrical circuit including a conductor carrying pulses separated by guard intervals, a circuit network connected to a point in said conductor comprising:

means for amplifying signals at said point;

first means for inverting and coupling said amplified signals to said point in said conductor, whereby said conductor is clamped at a predetermined level of potential during said guard intervals;

second means for amplifying and coupling said amplified signals to said point in said conductor, whereby said pulses on said conductor are amplified;

and means for alternately connecting said first and said second means in said circuit.

5. In an electrical circuit including a conductor carrying pulses separated by guard intervals, a circuit network connected to a point in said conductor for amplifying said pulses and for clamping said conductor to a predetermined level of potential during said guard interval comprising:

a first amplifier having an input and an output;

means for applying said pulses to said input of said first amplifier;

a second amplifier having an input and an output;

coupling means for connecting the output of said first amplifier to the input of said second amplifier and for alternately amplifying and inverting the output of said first amplifier;

and means for applying the output of said second amplifier to said point in said conductor.

6. In an electrical circuit including a conductor carrying pulses separated by guard intervals, a circuit network, as claimed in claim 5, wherein said coupling means comprises a transformer having a plurality of windings including a pair of windings inductively coupled to effectively amplify said output of said first amplifier and a pair of windings inductively coupled to effectively invert said output of said first amplifier.

7. In an electrical circuit including a conductor carrying pulses separated by guard intervals, a circuit network, as claimed in claim 6, wherein said coupling means further comprises switching means for alternately connecting said amplifying pair of windings and said inverting pair of windings in said circuit arrangement.

8. A communication system comprising:

a plurality of communication terminals;

a signal transmisison link time-shared by said plurality of communication terminals;

a source of time-multiplexed signals separated in time by guard intervals;

a plurality of gating means individually associated with each of said communication terminals and operated in response to said time-multiplexed pulses for coupling said communication terminals to said signal transmission link;

and a circuit network connected to said signal transmission link for amplifying signals on said signal transmission link during said time-multiplexed pulses and for removing any signals remaining on said signal transmission link during said guard intervals comprising a first amplifier having an input and an output, means for applying said signals to said input of said first amplifier, a second amplifier having an input and an output, coupling means for connecting the output of said first amplifier to the input of said second amplifier and for alternately amplifying and inverting the output of said first amplifier, and means for applying the output of said second amplifier to said common transmission link.

9. A communication system comprising:

a plurality of communication terminals;

a signal transmission link time-shared by said plurality of communication terminals;

a source of time-multiplexed signals separated in time by guard intervals;

individual means for coupling each of said communication terminals to said signal transmission link, said couplng means including resonant transfer means of a specified resonant frequency for gating said signal onto said signal transmission link;

and a circuit network connected to said signal transmission link for amplifying signals on said signal transmission link during said time-multiplexed pulses and for removing any signals remaining on said signal transmission link during said guard intervals comprising a first amplifier having an input and an output, means for applying said signals to said input of said first amplifier, a second amplifier having an input and an output, coupling means for connecting the output of said first amplifier to the input of said second amplifier and for alternately amplifying and inverting the output of said first amplifier, and means for applying the output of said second amplifier to said common transmission link.

10. A communication system, as claimed in claim 9, wherein said coupling means included in said circuit network connected to said signal transmission link comprises a transformer having a plurality of windings including a pair of windings inductively coupled to effectively amplify said output of said first amplifier and a pair of windings inductively coupled to effectively invert said output of said first amplifier.

11. A communication system, as claimed in claim 10, wherein said coupling means further comprises switching means for alternately connecting said amplifier pair of windings and said inverting pair of windings in said circuit arrangement.

12. In a communication system, as claimed in claim 11, wherein said switching means is operative only for a period equal to one-half the resonant frequency of said resonant transfer means to amplify said signals.

References Cited in the file of this patent

UNITED STATES PATENTS

| | | |
|---|---|---|
| 2,580,421 | Guanella | Jan. 1, 1952 |
| 2,707,210 | Mathwich | Apr. 26, 1955 |
| 2,936,338 | James et al. | May 10, 1960 |